Aug. 12, 1969    J. J. KELMAR    3,460,934
BLAST FURNACE METHOD

Filed Dec. 19, 1966    2 Sheets-Sheet 1

Fig. 1.

INVENTOR.
JOHN J. KELMAR.

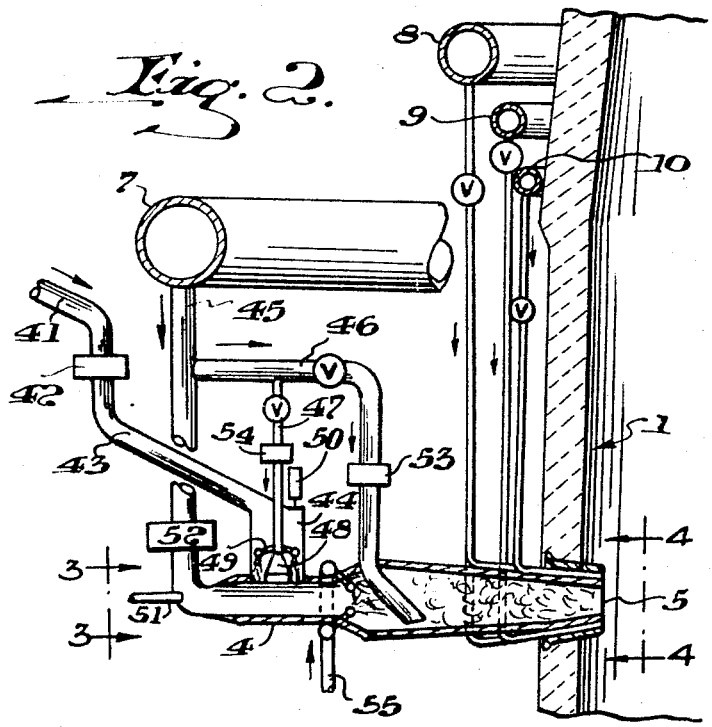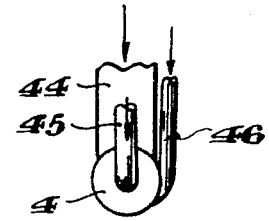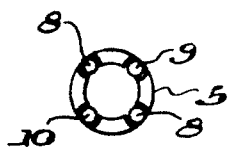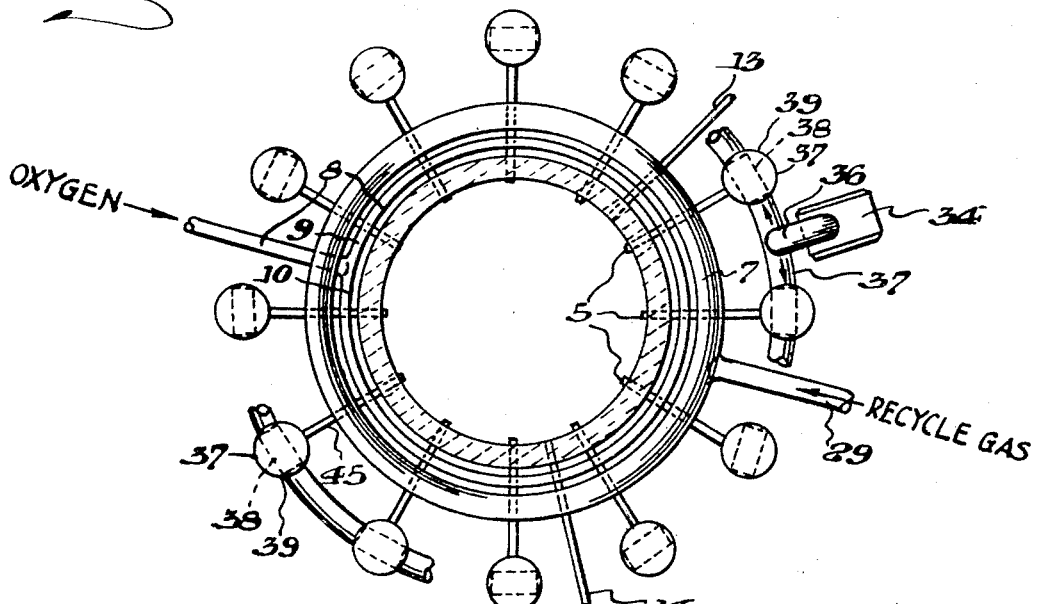

United States Patent Office 3,460,934
Patented Aug. 12, 1969

3,460,934
BLAST FURNACE METHOD
John J. Kelmar, 2205 Cypress Drive, White Oak Borough, McKeesport, Pa. 15131
Continuation-in-part of application Ser. No. 356,471, Apr. 1, 1964. This application Dec. 19, 1966, Ser. No. 602,960
Int. Cl. C22b 7/02; C21b 1/02
U.S. Cl. 75—25　　　　　　　　　　　9 Claims This application constitutes a continuation-in-part of my copending patent application, Ser. No. 356,471, filed Apr. 1, 1964, and now abandoned.

This invention relates to a blast furnace method for using all oxygen for reduction of average and low grade hematite ores to molten iron and ultimately to steel.

The production rate of a blast furnace is directly dependent upon the amount of heat released, the reduction gases produced, and the temperature at which the heat is released. In a conventional blast furnace the main source of heat is the combustion of the carbon in the coke with the heated air blast in the lower part of the furnace. The operation of a blast furnace in making iron is well known. Briefly, hot air blast is forced through tuyeres at the bottom of the furnace to furnish heat and oxygen for the combustion of the coke in the furnace charge. The resulting gas goes up through the furnace and reduces the ore, coke and flux to molten metal and slag, and then issues from the furnace as dust-laden lean combustible gas. Molten iron and slag form a pool and separate in the bottom of the furnace, which is tapped intermittently. The gas leaving the top of the furnace contains about 65 percent nitrogen and has calorific value of about 95 B.t.u. per cubic foot. The customary practice is to use 25 percent of this gas for preheating the air blast and 75 percent for other plant use.

It is the object of this invention to provide an improved method and apparatus for the reduction of average grade and low grade hematite ores in a blast furnace by replacing the air blast with 100 percent oxygen of 99.5 percent purity.

It is another object of this invention to reduce the high temperature flame generated from the combustion of pure oxygen with carbon and carbon monoxide to an optimum temperature of 3,650° F. in the hearth of the blast furnace.

It is another object of this invention to make the reduction of iron ore with reducing gases only and using carbon or coke for generating heat for the reduction process.

It is another object of this invention to fluidize solid material with recycle gas in a cyclone injector and inject the fluidized material through tuyeres into the hearth of the furnace.

It is another object of this invention to make the blast furnace hearth perform the function of an open-hearth furnace in the refining of iron into steel.

It is still another object of this invention to extend the process of bulk refining to a level where steel is produced in a blast furnace.

The use of pure oxygen in a blast furnace does not in any way alter or reduce the number of technical processes in the smelting of either normal pig iron or ferroalloys, nor does it create new ones. It does, nevertheless, have important effects on the reaction velocities and the transmission of heat from the gas to the materials.

The combustion of hydrocarbon fuel with pure oxygen produces a high temperature flame with very large increase in radiation heat transfer which is proportional to the 4th power of the flame temperature. Flame from oxygen leads to high thermodynamic efficiency in a furnace system. There is an expanding of heat content of combustion gases. With air, the maximum value for the heat content of combustion products is about 100 B.t.u. per cubic foot, while with oxygen the maximum value for heat content of combustion products is about 500 B.t.u. per cubic foot. These two factors, high temperature flame and high heat content, provide increased heat transfer by convection and radiation from the flame to the charge.

Oxygen flame efficiency rises with calorific value of gaseous fuel when operating at the highest temperature. By using recycle gas with a calorific value of 250 B.t.u. per cubic foot, the thermal efficiency is increased to approximately 65 percent, which represents the fuel energy available for heating the charge. It is therefore beneficial to expend heat energy to generate top gas that has a high calorific fuel value.

In a combustion flame the heat transfer takes place between the gases and solids across a thin stagnant gas film. This film becomes thinner as the gas velocity across the surface increases, thus increasing the convection heat transfer from high velocity gas flow. Natural convection occurs when there is no forced gas flow across the surface and heat is carried from the surface by convection currents through the stagnant boundary layer. The oxygen flame, by increasing the temperature, increases the natural convection heat flow and it is by this mechanism of heat that the convection heat transfer is directly related to the volume gas flow rate through the furnace. Thus, when the oxygen flame rises in the total volume of combustion products there is a corresponding rise in the efficiency of convection heat transfer.

With the rise of temperature the oxygen flame contains a large amount of latent heat from the dissociation of carbon dioxide and water vapor in the combustion gases. This latent heat is liberated on the surface of the charge when the high temperature gases come in contact with the relatively cooler charge.

In a conventional blast furnace the inert nitrogen gas in the air blast acts as a regulator for the flame temperature and reduces the combustion velocity of coke and oxygen. With nitrogen entirely replaced by oxygen, the speed of combustion is accelerated about five times. The regulating function for the flame temperature is now assumed by the thermal and chemical actions of the coolants comprising recycle gas and burden injected into the reaction zone.

The reactions in a oxygen blast furnace are governed not by affinities but by the temperature and equilibrium of relative quantities of oxygen, carbon monoxide, hydrogen and carbon dioxide. The measurement of the volume of percent of carbon monoxide, carbon dioxide, hydrogen and water vapor in the top gas, permits the furnace program to be calculated for heat balance, carbon balance, hydrogen balance and shaft efficiency.

The temperature and the amount of gas leaving the combustion zone determine the amount of heat available for the reduction of iron oxides. The combination of coke by oxygen blast is a highly exothermic reaction and leads to unduly high temperature in the hearth of the furnace. This combustion occurs in three stages, namely; (1) The oxygen reacts with solid carbon to form carbon monoxides, $2C+O_2=2CO$. This reaction occurs over a temperature range from 1,700° F. to 3,600° F. (2) The carbon monoxide migrates into space between the particles and reacts in the gas phase with further available oxygen to form carbon dioxide, $2CO+O_2=2CO_2$, which produces a flame temperature of about 5,400° F. (3) At this temperature, as the molecules of carbon dioxide and water become dissociated into atoms of carbon, oxygen and hydrogen respectively, there is absorption of heat for dissociation. As these atoms are set free they unite again into exothermic reactions producing heat. With the fall of temperature flame to an optimum of 3,650° F., the heat from recombining of the elementary substances is transferred into the charge.

Starting at 1,730° F., about 1.8 percent of carbon dioxide and 0.6 percent of water become dissociated. At the flame temperature of 5,400° F. and at the prevailing gas pressure in the tuyere zone, approximately 55 percent of carbon dioxide and 20 percent of water vapor are dissociated, respectively.

To prevent any hot bottom conditions from developing in the furnace, adequate heat absorption capacities and rapid heat transfer from the high temperature flame, is provided by the recycle gas and cold burden injected through the tuyeres. All the heat given out by the thermal mechanism of the process is dissipated sufficiently and rapidly and there is no self-heating condition set up in the system which might prevent or block heat dissipation and thus lead to an explosion. To obtain effective heat control as well as efficient heat utilization for the operating temperature of 3,650° F., 28 percent of the volume of top gas is recycled and mixed with 18 percent of the burden in a cyclone injector and this fluidized material composed of carbon dioxide, carbon monoxide, hydrogen, water vapor; and solids in powder form comprising iron ore, limestone coke and flue dust is injected into the hearth by compressed recycle gas.

A definite amount of heat energy is required for each ton of iron made to bring the ingredients up to operating temperature to help reduce them and to melt the slag and the product iron. In the process of producing required quantities of heat there is generated a large volume of reducing gases. These reducing gases, combined with recycle reducing gases, furnish all requirements for chemical reduction of ores.

In an air blast furnace at temperature of 2,000° F. and above, the reduction of ore is by carbon or direct reduction and it takes place in the lower portion of the furnace or in the smelting capacity of the hearth. Most of the reduction in this zone is done by carbon monoxide. The combustion product carbon dioxide that is formed is not stable in presence of excess carbon at high temperature and it is converted back to carbon monoxides, consequently the overall effect of the reaction is the same as though hot carbon had been the reducing agent and this reaction is called direct reduction. This conversion of coke into carbon monoxide is a carbon solution loss and it represents a high coke consumption because the coke intended for heat production is used for chemical reduction.

By recirculating 28 percent of the top gas, all the reducing gas requirements for chemical reactions are furnished; at the same time nearly 35 percent of total heat required is supplied to the furnace and all without consumption of coke. This recycle gas contains approximately 76 percent reducing units of carbon monoxide and hydrogen when the top gas is developed for a calorific value of 250 B.t.u. per cubic foot. Some hydrogen for the reducing gas is also derived form the materials entering the furnace, namely:

(1) Hydrogen in the natural gas.
(2) Hydrogen in the coal and coke.
(3) Hydrated water in the ore.
(4) Moisture charged in the raw materials.
(5) Steam injection.

The reaction from these materials are endothermic and contribute towards the controls of the high temperature flame. The injection of hydrocarbon fuel does not give a high production rate in a blast furnace. The production rate increases with the heat generated from the combustion of coke and carbon monoxide by oxygen.

Hydrogen is a very light gas and the volume generated will decrease the density of reducing gases, which results in a pressure drop in the furnace causing a reduction of the flue dust content in the top gas. With absence of nitrogen there is a lower ratio of the amount of gases to the amount of solids in the stack portion of the furnace. However, by the removal of fines below one-half (½) inch in size through a process of screening, the burden entering through the top of the furnace is prepared for the light reducing gases to penetrate to all surfaces of the ore material and therefore a high gas-to-solid ratio is not of much significance.

Ore reduction is the process of diffusion of gases into and out of the ore particles. Reduction reaction begins with adsorption of gas reducing agent on the surface of the oxide. The adsorbed molecules of the gas reducing agent combine with oxygen as the result of which a new gas forms and the crystal lattice of a new solid phase is started. After this dissorption of the gas there is formed a product of reduction. For the most efficient reduction the reducing gases are combined to furnish one carbon monoxide unit and one hydrogen reducing unit, thus achieving two reducing units. By this combination there is an advantage in using the good reducing powers of hydrogen in the early stages and carbon monoxide in the latter stages of reduction. The hydrogen can diffuse inward to the membrane, but larger molecules of the combustion product, water vapor, cannot diffuse outward, and the internal water vapor pressure rises until it is sufficient to burst the membrane or it stifles the reduction reaction. At 1800° F., its vapor pressure to stop the reaction is about 9 p.s.i. above the atmosphere while that required to break the membrane is somewhat higher. In the case of carbon monoxide reduction, the combustion product, carbon dioxide, will have a rising pressure, and the pressure to stifle the reaction is about 600 p.s.i., but before this pressure is reached the shell is burst and a new surface is exposed for reduction.

Small additions of carbon dioxide and water vapor to the gaseous reducing agents show considerable retarding effect on the reaction process. The adsorption capacity of carbon dioxide and water is greater than that of carbon monoxide and hydrogen. The molecules of carbon dioxide and water have a greater number of active points of surface and force out the reduction molecules causing a decrease in speed reduction. The effect of adsorption on reduction process is considerable at low temperature where thermal dissociation proceeds at very low speed. Therefore, for example, the reduction of ferrous oxide can occur at great speed at 1,100° F. when thermal dissociation is negligible; while, with increase of temperature the role of adsorption decreases and at a temperature of 1,700° F. the retarding action of carbon dioxide and water vapor on iron oxide disappears.

At the very high temperatures encountered in the lower part of the furnace, the reaction rates are very rapid and limited by the access of the reducing gases. Under these circumstances, hydrogen should reduce ores very much faster than carbon monoxide, since thermodynamically hydrogen is more effective at higher temperature. But at relatively low temperature below 1,600° F., carbon monoxide reduces ores at least as fast and some times faster than hydrogen. Generally the overall reaction with hydrogen is endothermic, while that of carbon monoxide is exothermic. However, both of these reactions will occur in the high temperature zone because the products of combustion, water and carbon dioxide are quite stable at the operating temperatures when there is no excess carbon.

In the smelting of ores, for each ton of iron produced the same amount of oxygen must be removed from high grade ores as from low grade ores. Reduction of low grade ores requires the melting of large quantities of gangue and flux materials which requires more heat and results in production of high slag volume. This slag volume is beneficial with oxygen combustion, as the slag serves the purpose of a protector and shields the molten metal from the high temperature flame. Furthermore, this slag is necessary for the removal of impurities of phosphorus and sulphur in further refining of iron to steel.

The ascending reducing gases start to reduce the iron oxide at 1,700° F. At this temperature the chemical equilibrium prevents all the carbon monoxide and hydrogen from being used up, consequently the amount of reducing gases must be in excess to the amount required for reactions and this accounts for the large volume of reducing gases in the top gas. This production of excess of carbon monoxide and hydrogen results in the active area of combustion zone to rise in the furnace thus causing the primary and final slag formation zone to shift from the shaft to the bosh where the slag no longer contains iron. Such slag formation zone is preferably and insures more uniform flow of ascending gases because the smaller the zone of slag formation or the temperature range between softening and melting, along the height of the furnace, the less impermeable layer of material being formed to block the upward flow of reducing gases. Furthermore, the hanging of the descending burden in the stack is caused by the low gas volume bringing about a condition where the iron oxide is melted before it is reduced which results in solidification or freezing of the slag in the descending burden. This condition disappears when liquid slag formation occurs in the bosh where optimum furnace working operation is achieved by the slag forming as the reduction process is completed.

In the reduction of ore to metal in a blast furnace the slag acts as a solvent and absorbs the reaction products of silicon oxide ($SiO_2$), manganous oxide ($MnO$), phosphorus pentoxide ($P_2O_5$), aluminum oxide ($Al_2O_3$), calcium oxide ($CaO$), magnesium oxide ($MgO$) and calcium sulphide ($CaS$). This basic slag is not oxidizing and therefore the impurities in the metal are not removed to the degree required for steel.

Accordingly my invention involves a method for oxidizing the basic slag by recycle gas combustion flame and by the addition of feed ores into the hearth and using this oxidized slag to purify iron into steel.

An oxidizing slag is the means by which impurities are separated from the metal and removed. Slags possess the power of dissolving the oxides of the impurities, and the composition of the metal beneath is controlled by the oxide content of the slag. The slag is oxidized from combustion of oxygen, carbon and recycle gas, and the resulting high temperature flame extending over the slag surface also provides a large transfer of heat to the metal bath. All the heat effecting the metal bath enters through the slag blanket. The temperature of the bath is controlled by the amount of fuel used and the amount of oxygen present. The excess oxygen over that required for combustion, is fused into the slag. The rate of oxygen fussion into the slag is effected by the thickness, composition, fluidity and the difference in temperature between the top and bottom of the slag. For a molten slag layer two feet thick with optimum temperature of 3,650° F. at the top of slag, the bottom of slag or the steel bath temperature will be 3,300° F.

The oxides in slag composition are acid and basic and when in liquid form they are dissociated electrolytically and contain practically no neutral molecules. When the slag is raised to a high temperature the atoms and molecules of the components become ionized as the electrons are stripped off by the violent collusion consequent on the thermal agitation of the slag particles. Thus inorganic substances of the slag begins to emit electrons at 470° F. increasing materially at over 780° F. and the emission is quite large at over 1,320° F. Chemical reactions between gases and oxides in the slag also emit electrons. A great excess of electrons are emitted from high temperature fused solids as compared to gases. However, the denser the gas becomes the greater is the emission of electrons. The presence of carbon monoxide, oxygen and hydrogen contribute to emission of electrons.

In fused and liquid slag the element particles are readily compounded with opposite charged particles. Thus lime ($CaO$) at high temperature in the liquid slag emits electrons and itself becomes positively charged. Other constituents of the slag that emits electrons are: iron ($Fe$) in iron oxide ($FeO$) and in ferric oxide ($Fe_2O_3$), magnesium ($Mg$) in magnesium oxide ($MgO$), and manganese ($Mn$) in manganous oxide ($MnO$). Consequently, at high temperatures the ionized condition of basic slag and the reducing gases give rise to a rapid diffusion of elements at the gas to slag and the slag to metal interface.

The hearth of a blast furnace has a large gas to slag and slag to metal interfacial area and by pure oxygen combustion there is developed a suitable environment for further acceleration of bulk refining of molten metal into steel through the rapid and instant reactions between the elements in metal, slag, recycle gas and oxygen. The interfacial area of a blast furnace is similar to that in an open-hearth furnace with the exception that in an open-hearth furnace the charge is made through open doors in a furnace atmosphere, while in my oxygen blast furnace the charge is fluidized and then injected into the hearth in a recycle gas atmosphere. The recycle gas dilutes the oxygen and aids in controlling the high temperature flame at the same time permitting large increase in volume of the gaseous products of combustion. The recycle gas besides furnishing some heat of its own to the process also furnishes carbon dioxide, carbon monoxide and hydrogen for reaction purpose.

In my blast furnace the reduction process for iron making and the oxidation process for steel making are carrier out in a continuous operation. The metallic iron, containing reduced substance, and the slag, containing unreduced substance or oxides, trickles down from the smelting zone or bosh and passes through the combustion zone and are then collected in the hearth with the molten slag floating on top of the metal bath. The trickling metal and slag has the composition indicated in Table I.

TABLE I
[Metal slag temp., 3,650° F.]

| Metal composition, weight percent | | | | | | Slag composition, weight percent | | | | | | |
| --- | --- | --- | --- | --- | --- | --- | --- | --- | --- | --- | --- | --- |
| Fe | C | Si | Mn | P | S | $SiO_2$ | FeO | MnO | $Al_2O_3$ | CaO | MgO | CaS |
| 96.00 | 2.00 | 1.07 | 0.90 | 0.20 | 0.03 | 33.00 | 0.10 | 1.00 | 15.00 | 44.00 | 2.50 | 4.40 |

Into this descending stream of trickling metal and slag there is a continuous injection of solid material and recycle gas comprising of feed ores, limestone, fuel, and gases of carbon dioxide carbon monoxide, hydrogen and water vapor. All the slag in the reaction zone is being oxidized by the oxygen flame and by the ore addition. From the feed ores injected on the slag surface there is a fast reduction of $Fe_2O_3$ and $Fe_3O_4$ into iron ($Fe$), iron oxide ($FeO$), and oxygen. The iron oxide ($FeO$) dissolves in the slag and becomes the main vehicle for transferring the oxygen from the slag to the metal bath for reduction of impurities. Concurrently with feed ore reduction there is rapid decomposing of injected limestone ($CaCO_3$) into lime ($CaA$) and carbon dioxide ($CO_2$) resulting in fast dissolution of lime to form basic slag; wherein the carbon dioxide is reduced by iron to form iron oxide ($FeO$) and carbon monoxide ($CO$). The higher the lime ($CaO$)

content of the slag the greater is the amount of iron oxide (FeO) that can be dissolved in it.

In the combination zone the carbon monoxide from carbon combustion and recycle gas, surrounds the droplets of metal and slag and reduces the oxides of silicon (SiO$_2$), and manganese oxide (MnO) according to these equations:

$$SiO_2 + 2CO = Si + 2CO_2$$
$$MnO + CO = Mn + CO_2$$

The reduced silicon and manganese alloys with iron in all proportions and is dissolved in the metal bath underneath the slag. The iron oxide (FeO) in the slag diffuses into the metal bath and reacts with silicon and manganese by these equations:

$$Mn + FeO = MnO + Fe$$
$$Si + 2FeO = SiO_2 + 2Fe$$

The two oxides flux together to form a fusible silicates of iron and manganese in the form of MnO.SiO$_2$, a slag compound which rises through the bath into the slag. Some manganese is retained in the metal to decrease the bad effects of sulphur with which it combines forming MnS and replacing iron in the sulphide (FeS).

For the sulphur and phosphorus reduction, in addition to carbon monoxide reaction, lime is injected to keep the slag basic. The sulphur enters the blast furnace mainly from coke and is released into the gas stream as hydrogen sulphide (H$_2$S) or a gaseous compound of carbon monoxide and sulphur (COS) which combines with iron oxide (FeO) by this reaction:

$$FeO + COS = FeS + CO_2$$

The sulphur that combines with iron to form sulphide of iron (FeS) is removed by reduction in presence of basic lime by this chemical reaction:

$$FeS + CaO + CO = CaS + Fe + CO_2$$

The sulphur will be normally retained in the slag as calcium sulphide (CaS). The presence of large volume of basic slag is beneficial because the calcium sulphide (CaS) has a fixed solubility in a given slag and the greater the slag volume per unit weight of metal the geater is the weight of sulphur it will absorb from the metal.

The reduction of phosphorus is expressed by this equation:

$$P_2O_5 + 5CO = 2P + 5CO_2$$

The final reduction of phosphorus takes place in the hearth and is completely reduced. The metal with dissolved phosphorus passes through the oxidized slag zone containing iron oxide (FeO). In the presence of iron oxide the phosphorus is oxidized to pentoxide by this equation:

$$2P + 5FeO = 5Fe + P_2O_5$$

and combines principally with iron oxide (FeO) by this reaction:

$$3FeO + P_2O_5 = 3FeO.P_2O_5$$

This ferous phosphate then becomes a slag product.

The iron oxide FeO is later displaced by lime (CaO) by this reaction:

$$3CaO + 3FeO.P_2O_5 = 3CaO.P_2O_5 + 3FeO$$

The tricalcium phosphate (3CaO.P$_2$O$_5$) is quite stable in slag in the presence of excess lime (CaO). For practical phosphorus elimination the basicity ratio of calcium oxide (CaO) to silicon oxide (SiO$_2$) is maintained above 2:1.

In the metal bath beneath the slag the final purification takes place and the dissolved elements are oxidized in the order of silicon, manganese, phosphorus and carbon. The reactions representing the oxidation of these elements are represented by the following equation:

(1) Si (in Fe) + 2O (in Fe) = SiO$_2$ (slag).
(2) Mn (in Fe) + O (in Fe) = MnO (slag).
(3) 2P (in Fe) + 5O (in Fe) + 4CaO = 4CaO.P$_2$O$_5$ (slag).
(4) 2C (in Fe) + 3O (in Fe) = CO (gas) + CO$_2$ (gas).

The activities of the substances involved in the above reactions constitute the refining of the metal in the bath. Reaction (1) results in the formation of silicate (SiO$_2$) which is insoluable in steel and goes into the slag. Reaction (2) results in the formation of basic oxide (MnO) which is only slightly soluable in steel, most of it goes into slag. Reaction (3) includes slag-forming compound (CaO) which combines with oxides of phosphorus (P$_2$O$_5$) and goes into slag as 4CaO.P$_2$O$_5$. Reaction (4) produces the gases carbon monoxide and carbon dioxide. Usually over 90 percent of the gas is carbon monoxide which burns to carbon dioxide above the slag. The elimination of carbon, therefore produces no oxides which require a flux for its removal. There is sufficient oxygen in the combustion gases to oxidize the carbon monoxide to carbon dioxide in order that oxidizing conditions prevail.

During the refining period the bath temperature is maintained at 3,300° F. At this temperature the residual oxygen in the steel reacts with carbon and forms carbon monoxide which gives rise to a boil as it leaves the steel bath and enters the slag. By this boiling action the oxygen content of the steel is reduced to a value that deoxidizers are not required thus eliminating the formation of inclusions in the bath from the deoxidation products. For this condition of the metal bath only a short refining time is required under the slag. The oxidation products of the slag are removed continuously by slag flush between successive steel tappings. The method of continuous casting of steel and slag combined with slag separation outside the blast furnace can be carried out if desired.

The final steel and slag has the composition indicated in Table II.

TABLE II.—METAL TEMP., 3,300° F.

| Metal composition, weight percent | | | | | | Slag composition, weight percent | | | | | | | | |
|---|---|---|---|---|---|---|---|---|---|---|---|---|---|---|
| Fe | C | Mn | P | S | O$_2$ | FeO | Fe$_2$O$_3$ | CaO | MnO | MgO | SiO$_2$ | P$_2$O$_5$ | Al$_2$O$_3$ | S |
| 99.40 | 0.07 | 0.37 | 0.02 | 0.01 | 0.005 | 11.10 | 4.3 | 45.90 | 6.30 | 6.20 | 18.50 | 3.64 | 4.00 | 0.06 |

The addition of alloy agents for different quality steel is made in the molten metal with appropriate composition with regards to phosphorus and sulphur. Such agents as copper, molybdenum and nickel may be added in the burden with feed ores. Oxidized materials such as aluminum, boron, titanium, vanadium and zirconium can be added in the ladle or ingots to minimize oxidation losses.

Hydrogen pick up in the steel is kept to a very low value with the solubility being about .0002 percent by weight. The following factors tend toward reducing the hydrogen content of the finished steel:

(1) Minimum water vapor in the recycle gas.
(2) Vigorous carbon boil with basic slag and iron content that ensures rapid carbon removal.
(3) No recarburizing done in the bath.
(4) No deoxidizers added in the bath.
(5) Deep steel bath favors low hydrogen pick up.

To produce 2,000 lbs. of steel from an average grade of hematite ore mix, the following are the relative weights of ore ingredients in the burden entering the furnace.

| | Weight in pounds |
|---|---|
| $Fe_2O_3$ | 2,830 |
| $SiO_2$ | 403 |
| $Al_2O_3$ | 170 |
| FeS | 49 |
| $CaSO_4$ | 4 |
| $Ca_3P_2O_8$ | 19 |
| $H_2O$ | 580 |

The burden charge for the furnace is proportioned for 82 percent of the charge by weight to enter the top of the furnace and 18 percent to be injected in the bottom. The burden for the top charge is screened from four (4) inches to one-half (½) inch in size and comprises the following quantities.

| | Weight in pounds |
|---|---|
| Ore | 3,380 |
| Coke | 900 |
| Limestone | 780 |

The material for injection through the tuyeres is composed of 18 percent of the burden by weight and 28 percent of the top gas by weight recycled. The solid material is pulverized into powder form to pass 100 percent through a 50 mesh screen. This material is fluidized in proportion by weight of 52 percent recycle gas and 48 percent solids. The fluidized material is forced through tuyeres into the furnace. Oxygen, natural gas and fuel oil are injected into the furnace through lance pipes channeled in the tuyeres.

The proportioned solids and gases are injected as follows:

| | Weight in pounds |
|---|---|
| Fine Ore | 780 |
| Coke breeze | 200 |
| Flue dust | 45 |
| Limestone | 270 |
| Steam | 60 |
| Fuel Oil | 48 |
| Natural gas ($CH_4$) | 25 |
| Recycle gas | 1,408 |
| Oxygen 99.5 purity | 1,200 |

Products leaving the furnace.

| | Weight in pounds |
|---|---|
| Steel | 2,000 |
| Slag | 1,100 |
| Top gas | 5,100 |

The composition of the top gas is the following:

| | Percent by volume |
|---|---|
| $CO_2$ | 20 |
| CO | 58 |
| $H_2$ | 18 |
| $H_2O$ | 3 |
| $N_2$ | 1 |

The top gas leaving the furnace has a calorific value of approximately 250 B.t.u. per cubic foot which requires 1100 lbs. of coke and 1200 lbs. of oxygen to be charged into the furnace per ton of steel. The heat expenditure in producing high calorific top gas is more then covered by the saving in power required for the generation of oxygen.

The flue dust content of the top gas is about 45 lbs. per ton of steel produced and has this analysis:

| | Percent by weight |
|---|---|
| C | 20.0 |
| $SiO_2$ | 12.5 |
| $Fe_3O_4$ | 49.0 |
| FeO | 10.5 |
| $Al_2O_3$ | 2.5 |
| MnO | 0.7 |
| CaO | 3.7 |
| MgO | 0.5 |
| FeS | 0.6 |

The preferred embodiment of the invention is illustrated in the accompanying drawing, in which my blast furnace system is shown more or less diagrammatically and the furnace itself is shown in a vertical section.

FIGURE 1 is a diagrammatic elevation view of a blast furnace and attendant apparatus for practicing my invention.

FIGURE 2 is a fragmentary view of the lower portion of the blast furnace shown in FIGURE 1 with a view of the cyclone injector and tuyere.

FIGURE 3 is an elevational view of the cyclone injector looking along line 3—3 of FIGURE 2.

FIGURE 4 is an elevational view of the tuyere looking along line 4—4 of FIGURE 2.

FIGURE 5 is a horizontal section of the furnace taken along line 5—5 of FIGURE 1.

Referring to the drawings in more detail, a blast furnace 1, has a stack 2 and a charging hopper 3 for receiving burden composed of iron ore, limestone and coke. In the bottom of the furnace there is a ring of cyclone injectors 4 for receiving, in pulverized form, burden composed of ore, flue dust, coke breeze and limestone. On the injector there is a tuyere 5 or nozzle for projecting the material into the combustion zone 6. Circumferentially around the furnace there is a bustle pipe 7 for delivering compressed recirculating gas to the cyclone injectors. There are rings of pipes 8, 9 and 10 encircling the furnace for supplying respectively, oxygen, natural gas and fuel oil, at a pressure of 65 p.s.i. in the tuyere 5.

The combustion of the coke and hydrocarbon fuels with oxygen generates heat and reducing gases that ascend through the descending column of ore, coke and limestone. As the plastic ore descends from reduction zone 12 the liquid phase of slag formation begins to predominate at 2,400° F. level near bosh zone 11. In the bottom of the furnace slag runner 13 removes molten slag, and steel is removed through tapping hole 14.

The ascending reducing gases leave the furnace as top gas through uptake pipes 15 that communicate in a collecting chamber 16. From the chamber, the gas is led by downcomer pipe 17 into the dust separator 18 for separation of the major portion of the dust. The gas from the dust separator is led by line 19 with valve 20 to electrostatic precipitator 21. The cleaned gas leaves the precipitator by line 22 and valve 23 connected with control box 24, from which 72 percent of the cleaned gas is directed into the plant system. And 28 percent of the cleaned gas is recirculated from the control box through valve 25 and line 26 with valve 27 to turbo-blower 28. In the turbo-blower the gas is compressed to a pressure of approximately 52 p.s.i. and then, through valve 29 and line 30, the gas is led into bustle pipe 7.

Flue dust from precipitator 21, by conduit line 31, is discharged on a conveyor 32, which also receives flue dust from dust separator 18 from outlet 33. The collected flue dust is then discharged into hopper bin 34. Into this same bin, conveyor 35 delivers coke breeze, fine ore and limestone, with all material passing through one-half (½) inch mesh screen. From the hopper bin the composite material is carried by the vertical conveyor 36 and discharged into horizontal conveyor 37 arranged circumferentially around the furnace. Conveyor 37 is arranged to feed all storage tanks 38 arranged in a circle around the furnace. From each storage tank the material flows into a feeder 39 and regulated into a pulverizer 40 and reduced to powder form to pass 100 percent through 50 mesh screen, and then discharged into pipe 41 that leads into another feeder 42 where it is regulated for uniform flow into pipe 43 for flow into an injector 4.

The cyclone injector 4, illustrated in FIGURE 2, is provided with a chamber 44 for receiving solids from pipe 43. From bustle pipe 7, recycle gas is regulated to deliver into each injector by volume, 65 percent as primary gas through line 45, 29 percent as secondary gas through line 46, and 6 percent as tertiary gas through line 47. To avoid any presusre build-up in the receiving chamber 44, a relief safety valve 50 is provided. The bottom of the receiving chamber is cone shaped 48 for spreading the powder material into a circular thin sheet of solids dropping into the injector. To facilitate the uniformity of flow of the solids into the injector, there is mounted above the cone shaped bottom 48, a ring of jets 49 connected to line 47. The jets pointing downward operate under pressure approximately 10 p.s.i. above the pressure of the gas in the injector. Auxiliary compressors, not shown, furnish additional gas pressure for the jets. The solid material dropping into the injector is picked up by the primary gas stream 45 and as the gas and solids mixture moves towards the furnace, a secondary stream of gas 46 is passed tangentially into the injector and agitates the mixture by a violent whirlpool movement. This forward moving and rotating fluidized mass is then projected into the furnace through water cooled tuyeres 5 at a pressure of approximately 24 p.s.i.

FIGURE 3, illustrates the arrangement of cyclone injector 4 to receive solids from chamber 44 and the method of entry of primary gas by line 45 and the tangential entry of the secondary gas by line 46.

FIGURE 4, illustrates tuyeres 5, and shows channelled openings to receive two oxygen lines 8, one natural gas line 9 one fuel line 10.

For observation of the fluidized mass entering the furnace there is a peep sight 51 installed on the injetcor. To provide safety operation and prevent any flame propagation or gas explosion occurring in the injector, flame arrestors 52, 53, and 54 are installed on primary gas line, secondary gas line, and tertiary gas line respectively. The flame arrestors have uniform apertures with aspect ratios of about 15. As a further safeguard against flame and gas explosion hazards, steam from circle pipe 55 is sprayed into the injector by jets at a pressure of 700 p.s.i. and 500° F., delivering about 10 grains of moisture per cubic foot of gas.

On FIGURE 5, there is illustrated a horizontal sectional view of the furnace (1) taken along 5—5. The arrangement as indicated by hopper bin 34, vertical conveyor 36, horizontal encircling conveyor 37, storage tanks 38, and feeders 39, function as an attendant apparatus for delivering medium fine solids to be pulverized at each tuyere station. The oxygen line 8, gas line 9, and fuel oil line 10, encircle the furnace and are connected to outside sources for supply.

The independent and flexible operation for the heat input and temperature control at each tuyere zone is adjusted to the measurement of the volume percent of CO, $CO_2H_2$ along with $H_2O$, in the top gas. This arrangement permits the furnace to be operated under electronic computor control with respect to heat balance, carbon balance, hydrogen balance and shaft efficiency.

According to the provision of the patent statutes, I have explained the principle of my invention and have illustrated and described what I now consider to represent its best embodiment. However, I desire to have it understood that within the scope of the appended claims, the invention may be practiced otherwise than as specially illustrated and described.

I claim:
1. The method of making steel in a blast furnace, comprising of charging the furnace from the top with iron ore and coke and limestone, continuously delivering a blast of hydrocarbon fuel and substantially pure oxygen to the hearth of the furnace, recovering the top gases issuing from the top of the furnace, recirculating at least a portion of said top gases to the hearth of the furnace and utilizing said portion to continuously inject a mixture of fine combustible solids, pulverized ore and limestone into the hearth of the furnace.

2. The method recited in claim 1, in which said top charge forms approximately 82 percent of the furnace burden and said mixture forms the remainder.

3. The method recited in claim 1, in which approximately 28 percent of said top gas leaving the top of the furnace is used for injecting said mixture into the hearth.

4. The method recited in claim 1, in which the pressure of said oxygen is substantially 65 p.s.i.

5. The method recited in claim 1, in which said top gas is compressed to substantially 52 p.s.i. before injecting said mixture into the hearth.

6. The method recited in claim 1, in which flue dust is separated from said top gas leaving the furnace, less than half of said gas is used for injecting said mixture into the hearth, and pulverized coke and the separated flue dust from the combustible solids of said mixture.

7. The method recited in claim 1, in which the weight of the recirculated top gas is only slightly greater than the weight of said mixture injected into the hearth by the gas.

8. The method recited in claim 1, in which said top charge forms approximately 82 percent of the furnace burden and said mixture forms the rest, and only about 28 percent of the top gas leaving the furnace is used for injecting said mixture into the hearth.

9. The method recited in claim 1, in which said hydrocarbon fuel is a mixture of fuel oil and natural gas.

References Cited
UNITED STATES PATENTS

| | | | |
|---|---|---|---|
| 1,713,436 | 5/1929 | Heskamp | 75—25 X |
| 2,195,866 | 4/1940 | Le Clarick | 75—25 X |
| 2,790,711 | 4/1957 | Sellers et al. | 75—41 |
| 2,799,576 | 7/1957 | Gumz et al. | 75—41 |
| 2,938,782 | 5/1960 | Toulmin | 75—41 |

FOREIGN PATENTS

| | | |
|---|---|---|
| 275,601 | 10/1928 | Great Britain. |
| 872,062 | 7/1961 | Great Britain. |

L. DEWAYNE RUTLEDGE, Primary Examiner

H. W. TARRING, Assistant Examiner

U.S. Cl. X.R.

75—41, 42

UNITED STATES PATENT OFFICE
CERTIFICATE OF CORRECTION

Patent No. 3,460,934                                            August 12, 1969

John J. Kelmar

It is certified that error appears in the above identified patent and that said Letters Patent are hereby corrected as shown below:

Column 2, line 58, "combination" should read -- combustio Column 6, line 42, "carrier" should read -- carried --; line 7 "(CaA)" should read -- (CaO) --. Column 7, line 3, "combinatio should read -- combustion --.

Signed and sealed this 12th day of May 1970.

(SEAL)
Attest:

Edward M. Fletcher, Jr.                        WILLIAM E. SCHUYLER, JF
Attesting Officer                                   Commissioner of Patents